No. 832,970. PATENTED OCT. 9, 1906.
E. L. HALL.
CAMERA.
APPLICATION FILED JUNE 10, 1905.
2 SHEETS—SHEET 2.
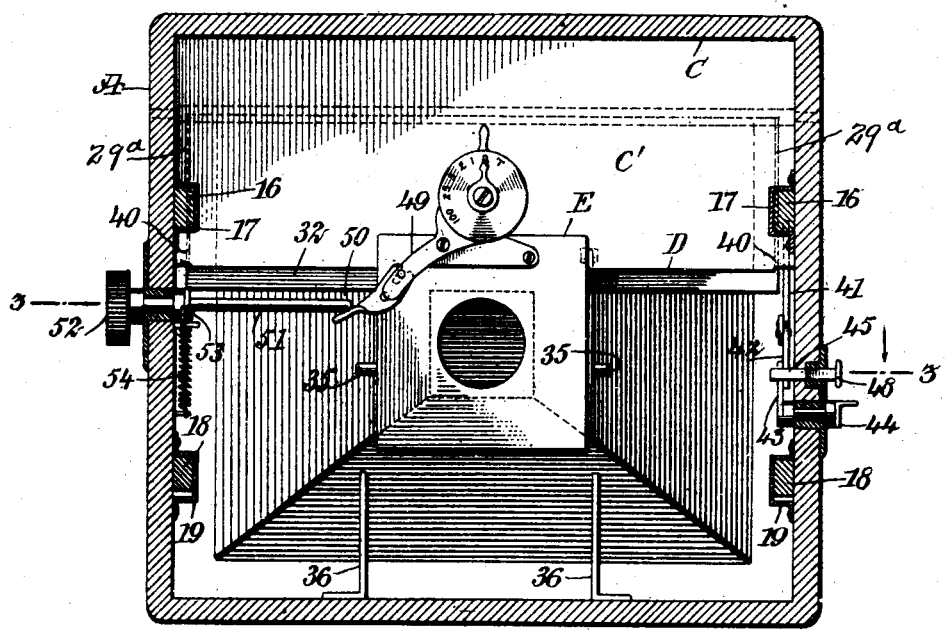
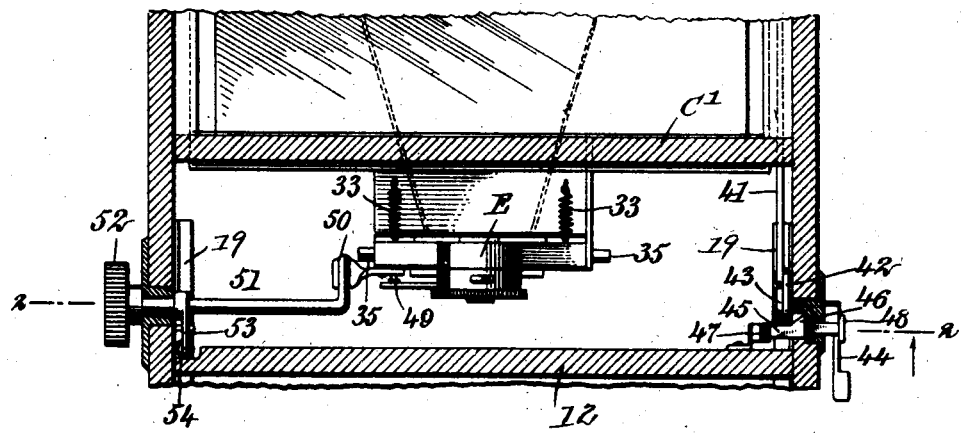
WITNESSES:
INVENTOR
Edward Lander Hall.
BY
ATTORNEYS

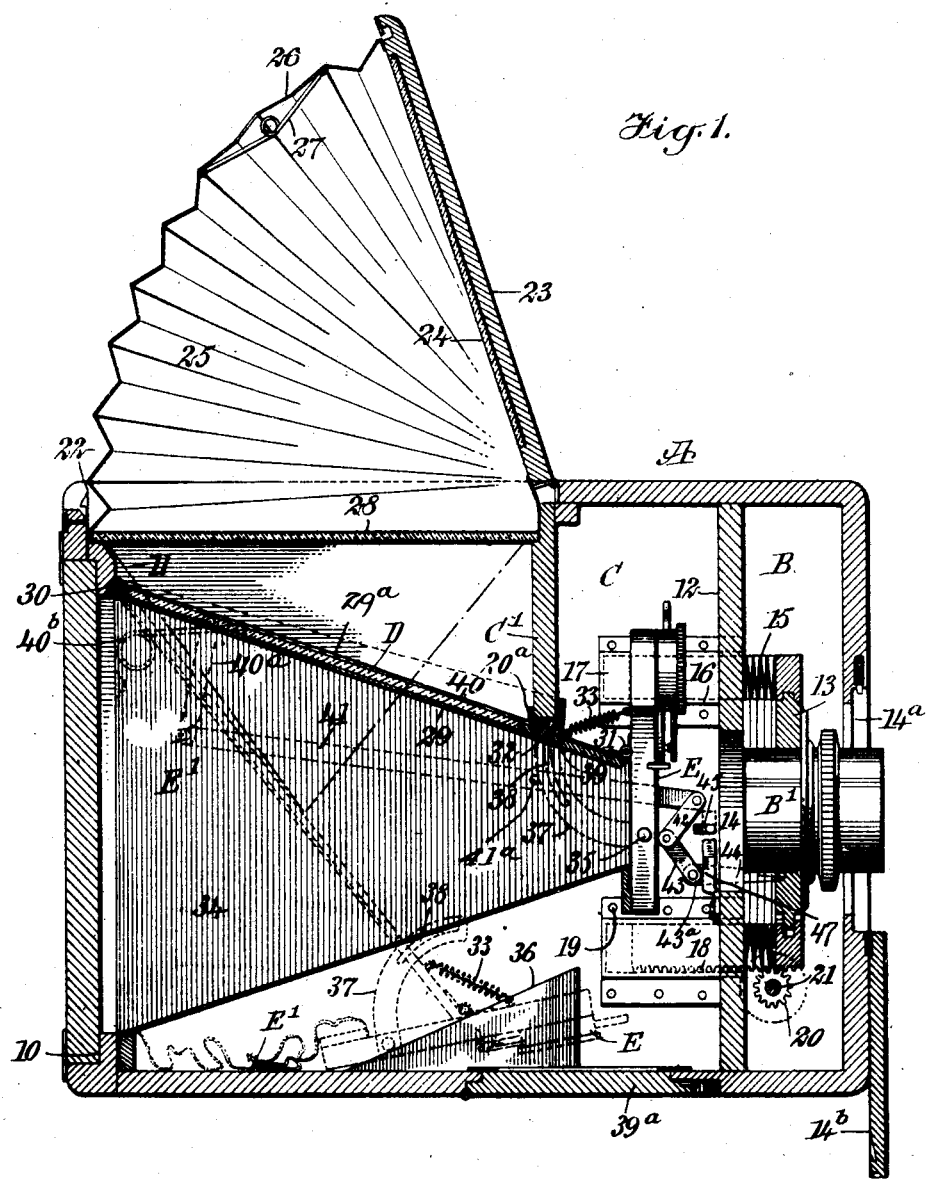

UNITED STATES PATENT OFFICE.

EDWARD LANDER HALL, OF NEW YORK, N. Y.

CAMERA.

No. 832,970.          Specification of Letters Patent.          Patented Oct. 9, 1906.

Application filed June 10, 1905. Serial No. 264,688.

*To all whom it may concern:*

Be it known that I, EDWARD LANDER HALL, a citizen of the United States, and a resident of the city of New York, borough of Brooklyn, in the county of Kings and State of New York, have invented a new and Improved Camera, of which the following is a full, clear, and exact description.

The purpose of the invention is to provide a compact, simple, and inexpensive camera of the type in which the shutter is connected with the focusing - mirror in such manner that when the mirror is brought to focusing position the shutter will be carried out of the focal plane of the lens and whereby when the mirror is carried up to effect an exposure the shutter is automatically carried to working position relative to the lens and is also automatically operated.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the camera, the parts being shown by full lines in position for exposure and by dotted lines in position for focusing. Fig. 2 is a vertical transverse section taken practically on the line 2 2 of Fig. 3; and Fig. 3 is a horizontal section through that portion of the camera-box in which the shutter is located, the section being taken practically on the line 3 3 of Fig. 2.

A represents a camera-box which is divided into a lens-compartment B and a view compartment or chamber C by means of a partition 12. The box is provided with the usual rear opening 10 to receive a plate-holder, and this opening 10 is surrounded by a frame 11 at the inner portion of the box. (Shown best in Fig. 1.)

The lens B' is located opposite an opening 14 in the partition 12, and a suitable opening 14ª is made in the front of the box for the outward passage of the lens, and this opening 14ª when the box is not in use is closed by a door 14ᵇ.

The lens-board 13 is adjustably connected with the partition 12 by a bellows 15, and the lens-board is guided in its movement by upper bars or plates 16, secured to its side portions, and the said bars or plates have sliding movement in housings 17, located within the camera-box at its sides, as is shown in Figs. 1 and 2, and rack bars or plates 18 are secured to the lower portion of the said lens-board at its sides. These rack-bars have sliding movement in housings 19. (Also shown in Figs. 1 and 2.) The teeth of the rack-bars 18 engage with pinions 20, secured upon a shaft 21, operated at the exterior of the camera-box during the focusing operation.

A short partition C' is located at the rear of the partition 12. The partition 12 extends from side to side and from top to bottom of the camera-box; but the partition C' extends from the upper portion of the box to only a predetermined distance downward, but reaches from side to side of the box. The lower end of this short rear partition C' is provided with a covering 20ª, of felt or dark cloth, for a purpose to be hereinafter described.

An opening 22 is made in the upper portion of the camera-box A, extending from the partition C' to the rear of the said box, and this opening is normally closed by a hinged cover 23, preferably provided with a mirror 24 upon its inner face. The said cover 23 is connected with the marginal portions of the opening 22 by a bellows 25, in which bellows a sight-opening 26 is made, the said opening being prevented from accidentally closing when the cover 23 is raised for focusing by means of a spring-yoke 27, located within the bellows at the said opening 26. At the bottom portion of the space inclosed by the said cover 23 and the bellows 25 a ground glass 28 is secured.

A focusing-mirror D is located beneath the ground glass 28, which mirror is set in a plate 29, having a hinged connection 30 with the upper portion of the framing 11 around the opening 10 for the plate-holder, as is shown in Fig. 1, and the said plate 29 is provided with a flange 29ª, extending upwardly from each side, as is shown by dotted lines in Fig. 1, which flanges when the mirror D is in its upper position, or position for exposure, enter grooves in the sealing-strips 40, located at the sides of the box between the back and the partition C', the lower edges of which sealing-strips have the same inclination as that of the mirror when in the upper position. (Shown in Fig. 1.)

It will be understood that the sealing-strips 40 are simply strips of wood or metal located in the rear chamber of the camera-box at each side, extending from the rear of the partition C' to the rear wall of the box, the lower edges of the strips being inclined to correspond to the inclination of the mirror D when said mirror is in an upper position, or in a position for the exposure of a plate, and a space is made to intervene between the side walls of the camera-box and the sealing-strips to receive projections from the mirror-frame, to be hereinafter described, in order to make a light-tight connection at such points when a plate is to be exposed.

A shutter E is attached to the plate 29 at its forward end by a hinge 31, and the said plate is provided with an upright strip 32, adapted to engage the front lower portion of the short partition C' when the mirror is in place to effect an exposure, in which position of the mirror an engagement is effected against the covering 20ª of the partition C', making thereby a light-tight connection.

A bellows 34 is secured to the mirror-supporting plate 29, the shutter E, and the framing 11 around the opening 10 for the plate-holder, so that a perfect collapsible exposure-chamber E' is obtained, having the shutter E at one end and the plate to be exposed at the opposite end. Springs 33 are attached to the shutter E and to the mirror-carrying plate 29, which springs tend to hold the shutter in an upright position.

The shutter E is provided with pins 35, which extend out through its side surfaces. These pins when the bellows is dropped and the mirror D is carried to focusing position engage with the inclined upper faces of plates 36, which are secured to the bottom portion of the camera. These plates 36 are highest at their forward ends, so that when the mirror D is carried to focusing position and the pins 35 of the shutter E engage with the plates 36 the shutter is carried down substantially parallel with the bottom of the camera-box, as is shown by dotted lines in Fig. 1. and entirely out of the field of the lens B', at which time the springs 33 are placed under tension. The movement of the shutter E is limited, preferably, by attaching a segmental arm 37 to the shutter at one of its sides, which segmental arm is provided with a longitudinal slot 38, and the said slot 38 receives a pin 39, which is secured to a side edge of the mirror-carrying plate 29.

It may here be remarked that the upright strip 32 of the mirror-carrying plate 29 extends from side to side of the camera and that the said plate in its upper position engages with the sealing-strips 40, as shown in Fig. 2, so as to prevent any possible leakage of light to the exposure-chamber.

In order that the shutter E may be conveniently set for time or for instantaneous work, a door 39ª is placed in the bottom of the box, as is shown in Fig. 1, which when opened admits of ready access to the shutter.

The focusing-mirror D, the exposure-chamber E', and the shutter E are operated from the exterior of the camera-box in the following manner:

A link 40ª is pivoted to one side of the focusing-mirror or its carrying-plate near the pivot of the latter, as shown in Fig. 1. The link 40ª is also pivoted to the rear end of an arm 41, which arm extends along the inner side of the camera-box to a point in advance of the shutter E, where a downwardly-extending link 42 is pivoted to the said arm, and the link 42 in its turn is pivoted to a second link 43, which latter link through the medium of a spindle 43ª is connected with a crank 44 at the outside of the camera-box. The links 42 and 43 constitute a toggle, and the arm 41 is pivoted to the box A at a point 41ª between its forward end and its center, and a spring 40ᵇ, secured to the rear portion of the camera-box, has such engagement with the carrying-plate 29 of the focusing-mirror D as to carry and hold said plate in the upper position. (Shown by full lines in Fig. 1.)

When the focusing-mirror is in its upper position, the strip 32 and that portion of the carrying-plate 29 below the partition C' engages with the material 20ª, covering the lower edge of the partition, and thus a light-tight connection is made between the said plate 29 and the said partition C'.

When the mirror-carrying plate 29 is in its upper position, the links 42 and 43 are at an angle to each other, as is shown in Fig. 1; but when the crank 44 is turned so as to bring the two links 42 and 43 in longitudinal alinement the mirror D is carried to the lower position, (shown by dotted lines in Fig. 1,) which is the position for focusing, and the pins 35 of the shutter E, traveling on the inclined surfaces of the plates 36 at the bottom of the camera, will cause the shutter E to face downward and closely approach the bottom of the camera, taking the said shutter entirely out of the field of the lens. The bellows 34 at the same time accommodates itself to the focusing position of the mirror.

A trip-latch 45 is mounted to slide in the camera-box, which trip-latch extends through the box to a point adjacent to the forward edge of the link 42, as is shown in Fig. 1, and the said trip-latch 45 is provided with a head 46 at its outer end, the said head being more or less inclined. This trip-latch 45 is held in place by a spring 47 and is operated through the medium of a push-button 48, as is shown best in Figs. 2 and 3. Thus when the focusing-mirror is in its lower or focusing position and the links 42 and 43 are straight and it is desired to bring the mirror up to make an exposure it is simply necessary to push the trip-finger 45 inward by pressing the push-button 48, whereupon the head 46 of the trip-finger will be brought in such engagement with the link 42 as to throw the said link rearward and permit the spring 40$^b$ to act to carry the mirror to its upper or normal position.

The shutter E is provided with the usual trip-finger 49, and the said finger is adapted to be engaged by the inner longitudinally-disposed end 50 of a trip-bar 51 of angular construction, which trip-bar is mounted to turn in a side of the camera-box, as illustrated in Figs. 2 and 3, and is turned through the medium of a knob 52 at its outer end. The trip-bar 51 is provided with a crank-arm 53, and a spring 54 is secured to said arm and to the inner face of the camera-box, as is particularly shown in Fig. 2, so as to hold the inner member 50 of the said bar in a horizontal position. When the focus has been obtained and the trip-latch 45 has been pressed inward to permit the focusing-mirror to be carried to its upper position, (shown by full lines in Fig. 1,) the trip-finger 49 of the shutter E will engage with the inner member 50 of the trip-bar 51 and the said finger 49 will immediately operate the shutter.

When the shutter is set for time exposure, the trip-finger 49 of the shutter is operated by simply turning the trip-bar 51 until the finger 49 is pressed downward, whereupon the trip-bar 51 is released, and its spring 53 will immediately restore the said bar to its normal position—that is to say, the arm or inner member 50 of the trip-bar 51 will be so far above the lower end of the trip-finger 49 as to permit the same to rise far enough to operate the shutter to a closed position.

Having thus described my invention, I claim as new and desire to secure by Letters Patent—

1. In a camera, a box, a lens within the box, a bellows exposure-chamber having a hinged connection with the back of the box and located within the same, a tension device having a lifting influence upon the said chamber, a focusing-mirror constituting the upper portion of the chamber, a spring-controlled shutter hinged to the forward portion of the chamber, an automatic folding mechanism for the shutter, manually-operated devices for folding the said chamber, which devices cause the automatic folding mechanism to operate, and means for automatically operating the shutter when the said chamber is raised to normal position.

2. In a camera, a box, a bellows exposure-chamber, a focusing-mirror forming the upper portion of the chamber, a spring-controlled shutter having folding relation to the chamber, external means for controlling the movement of the chamber, internal means for folding the shutter face down out of the field of the lens when the chamber is folded and the mirror is brought to focusing position, which means include guides from the shutter, having limited movement with reference to the upper portion of the exposure-chamber, inclined planes on the bottom of the camera-box, and projections from the shutter which engage the inclined planes when the focusing-bellows is collapsed.

In testimony whereof I have signed my name to this specification in the presence of two subscribing witnesses.

EDWARD LANDER HALL.

Witnesses:
J. FRED. ACKER,
JNO. M. RITTER.